US012669147B2

(12) United States Patent
Zou et al.

(10) Patent No.: US 12,669,147 B2
(45) Date of Patent: Jun. 30, 2026

(54) ROLLING BEARING WITH ELECTRICALLY INSULATING COATING

(71) Applicant: AKTIEBOLAGET SKF, Gothenburg (SE)

(72) Inventors: Zhonghua Zou, Shanghai (CN); Hongyan Wang, Shanghai (CN); Yanqin Gao, Shanghai (CN)

(73) Assignee: AKTIEBOLAGET SKF, Gothenburg (SE)

( * ) Notice: Subject to any disclaimer, the term of this patent is extended or adjusted under 35 U.S.C. 154(b) by 121 days.

(21) Appl. No.: 18/437,311

(22) Filed: Feb. 9, 2024

(65) Prior Publication Data

US 2024/0280140 A1 Aug. 22, 2024

(30) Foreign Application Priority Data

Feb. 17, 2023 (CN) .......................... 202310179983.9

(51) Int. Cl.
| | |
|---|---|
| *F16C 19/06* | (2006.01) |
| *F16C 19/52* | (2006.01) |
| *F16C 33/58* | (2006.01) |
| *F16C 33/62* | (2006.01) |
| *F16C 33/64* | (2006.01) |
| *F16C 35/077* | (2006.01) |

(52) U.S. Cl.
CPC .............. *F16C 19/52* (2013.01); *F16C 19/06* (2013.01); *F16C 33/586* (2013.01); *F16C 33/62* (2013.01); *F16C 33/64* (2013.01); *F16C 35/077* (2013.01); *F16C 2202/30* (2013.01); *F16C 2208/36* (2013.01); *F16C 2208/52* (2013.01); *F16C 2208/60* (2013.01); *F16C 2223/42* (2013.01); *F16C 2240/60* (2013.01)

(58) Field of Classification Search
CPC ........ F16C 19/06; F16C 19/52; F16C 33/586; F16C 33/62; F16C 33/64; F16C 35/077; F16C 2202/30; F16C 2208/36; F16C 2208/42; F16C 2208/52; F16C 2208/60; F16C 2223/42; F16C 2240/60
See application file for complete search history.

(56) References Cited

U.S. PATENT DOCUMENTS

| | | | | |
|---|---|---|---|---|
| 5,375,933 A | * | 12/1994 | Mizutani | F16C 33/62 |
| | | | | 384/492 |
| 2001/0014545 A1 | * | 8/2001 | Ito | F16C 19/52 |
| | | | | 439/19 |
| 2004/0066997 A1 | * | 4/2004 | Inukai | F16C 33/586 |
| | | | | 384/476 |
| 2013/0183539 A1 | * | 7/2013 | Guo | B05D 1/06 |
| | | | | 427/470 |
| 2018/0128317 A1 | * | 5/2018 | Horchheimer | F16C 33/62 |

FOREIGN PATENT DOCUMENTS

DE 102022001807 A1 * 11/2023 .............. F16C 19/52

* cited by examiner

*Primary Examiner* — Phillip A Johnson
(74) *Attorney, Agent, or Firm* — J-TEK LAW PLLC; Scott T. Wakeman; Mark A. Ussai

(57) ABSTRACT

An electrically insulated bearing ring includes a polymeric insulating coating for blocking the passage of leakage currents, the coating being formed by spraying on at least one surface of the bearing ring. The electrically insulated bearing ring or rings may be incorporated into a rolling bearing.

14 Claims, 1 Drawing Sheet

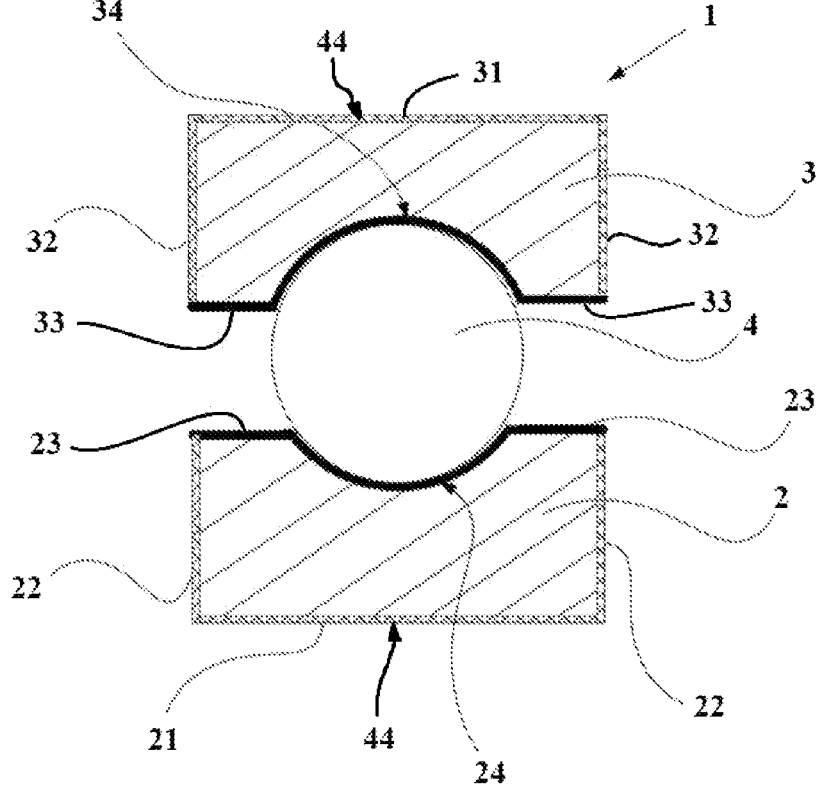

ROLLING BEARING WITH ELECTRICALLY INSULATING COATING

CROSS-REFERENCE

This application claims priority to Chinese patent application no. 202310179983.9 filed on Feb. 17, 2023, the contents of which are fully incorporated herein by reference.

BACKGROUND OF THE INVENTION

The invention relates to rolling bearings, and in particular to electrically insulating coatings for bearing rings.

During the design, manufacture or installation of a motor, deviations in pole distribution or shaft position can lead to asymmetries of the magnetic field. The magnetic flux alternates between symmetrical and asymmetrical states so that a rotating shaft cutting the magnetic lines during rotation forms an induced electric potential and the voltage difference between the shaft and a housing is called the "shaft voltage" (i.e., the voltage acting between the inner ring and outer ring of the bearing). When the amplitude of the shaft voltage is great enough to break through a lubricant film, an electric current will pass through the outer ring, the lubricant film and the inner ring of the bearing to form a "shaft current" (also known as "leakage current"). The electrical leakage current caused by the lubricant film discharge may form micro-pits on the surfaces of the bearing raceways, a phenomenon known as "galvanic corrosion". Even when current strength is relatively weak, galvanic corrosion phenomenon still occurs.

A traditional method of blocking or preventing leakage current is to provide an electrically insulating coating on a radial surface of a bearing ring (typically the outer surface of the outer ring and/or the inner surface of the inner ring). Conventional electrically insulating coatings are typically formed of ceramic materials, usually containing a composition of aluminum trioxide, and are formed on the above-mentioned surfaces of the bearing rings by plasma spraying. Although ceramics are insulating materials, the dielectric constants of ceramics are usually between 8.5 and 10, and as such, are polar or even strongly polar dielectric materials.

If the inner and outer rings of a bearing are considered to be a type of parallel plate capacitor, then according to the equation $C=\varepsilon S/d$ (where C is the capacitance value of a parallel plate capacitor, $\varepsilon$ is the dielectric constant of the medium between the poles, S is the area of the poles, and d is the distance between the poles), a ceramic material with a relatively high dielectric constant will result in a higher capacitance value of the bearing. This means that, especially under high-frequency shaft voltage, the leakage current may still reach a relatively high amplitude, and the galvanic corrosion effect on the bearing may still be relatively significant. In addition, the plasma spraying process inevitably leaves material pores in the ceramic coating, thus requiring an additional sealing process to seal the pores to prevent these pores from affecting the electrical insulation properties of the coating by moisture retention in high humidity environments. Such a pore sealing process further increases the manufacturing cost of the ceramic coatings.

SUMMARY OF THE INVENTION

To solve the above technical problems, the present invention provides an electrically insulated bearing ring comprising a polymeric insulating coating for blocking or preventing the passage of leakage current, the coating being formed by spraying on a corresponding surface of the bearing ring.

On average, the dielectric constant of polymers is roughly equivalent to ⅓ that of ceramics. All other things being equal, the capacitance of a bearing with a polymer as the insulating coating is only ⅓ that of a ceramic-insulated bearing, thus creating a capacitive impedance three times greater than the capacitive impedance of a ceramic-insulated bearing. The greatly increased capacitive impedance will significantly reduce the strength of the leakage current, fundamentally alleviating the galvanic corrosion effect triggered by high leakage current.

Based on the above principle, the present invention also provides a rolling bearing comprising the above-mentioned electrically insulated bearing ring, thus being able to mitigate the galvanic corrosion effect of the bearing and increase the expected life of the bearing.

The various embodiments and beneficial technical effects of the present invention will be described in detail below with reference to the accompanying drawings.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 1 shows a cross-sectional view of a partial structure of a rolling bearing and a polymeric insulating coating in accordance with the present invention.

DETAILED DESCRIPTION OF THE INVENTION

In the following description, the same or similar reference numerals are used throughout to indicate the same or similar elements. In addition, terms indicating orientation, such as "axial", "radial" and "circumferential", refer to the axial, radial and circumferential direction of the element being described unless otherwise limited or specified.

FIG. 1 shows a cross-sectional view of a partial structure of an insulated rolling bearing 1 in accordance with the present invention, which in the depicted embodiment is a ball bearing. The insulated rolling bearing 1 includes an inner ring 2, an outer ring 3 and at least one row of rolling bodies 4 (e.g., balls) disposed between an inner ring raceway 24 and an outer ring raceway 34. In contrast to other known bearings, the insulated bearing 1 has an insulating coating 44 formed on a corresponding surface of the inner ring 2 and/or outer ring 3 for blocking or preventing the passage of electric current. In the specific embodiment shown, the insulating coating 44 may be formed on an inner circumferential surface 21 of the inner ring 2 and/or on an outer circumferential surface 31 of the outer ring 3. In addition, the insulating coating 44 may further be formed on the end surfaces 22 on both axial sides of the inner ring 2 and/or on the end surfaces 32 on both axial sides of the outer ring 3 of the bearing 1.

In principle, the insulating coating 44 may be formed on all surfaces of the inner ring 2 and outer ring 3 of the bearing except for the raceways 24 and 34, even including the respective surfaces of the shoulders 23 on both sides of the inner ring raceway 24 and the shoulders 33 on both sides of the outer ring raceway 34. As used herein in the preceding and following description, each one of the above-mentioned surfaces of the bearing ring 2 or 3 that can be coated with an insulating coating 44 to prevent the leakage current through the rolling bearing 1 is referred to as a "corresponding surface".

Unlike ceramic coatings, the present invention uses at least one polymer as the constituent material of the insulating coating 44, particularly polymers with relative dielectric constants between 3.0 and 3.5. The average dielectric constant of such polymers is about one third (⅓) of the dielectric constant of ceramics, and therefore the capacitance value of these polymers is also only about ⅓ of the capacitance value of such ceramics. Since the capacitive impedance is inversely proportional to the capacitance value, the polymer coating 44 allows the capacitive impedance of the insulated bearing 1 to be on average three times the capacitive impedance of bearings with a ceramic coating. The substantially increased capacitive impedance of the insulated bearing 1 significantly weakens the electrical leakage current of the bearing 1 without considering other factors, thus significantly inhibiting electric corrosion of the bearing 1.

In the present invention, the polymer insulating layer or coating 44 is preferably formed on a corresponding surface (s) of a bearing ring 2 and/or 3 by means of spraying. Compared with an injection molding method used to form ceramic coatings, the spraying method or process has certain obvious advantages. On one hand, the injection molding process generally requires the formation of an embedded structure, such as for example slots, on the corresponding surface of a bearing ring to increase the bonding force between the injection molded insulation layer and the bearing ring. Such an embedded structure not only increases the processing cost of the bearing ring, but also changes or adversely affects the performance of the bearing ring. In contrast to the injection molding process, a spraying process generally creates microscopic craters on the surface of the bearing ring by sandblasting, which naturally improves the adhesion between the coating 44 and the substrate (bearing ring), thus eliminating the need for any embedded structure to be formed between the injection material layer and the substrate as with the injection molding process.

On the other hand, a spraying process may be performed without a mold, and therefore does not require a demolding process, and is not only highly productive but may also provide an arbitrarily adjustable thickness of a coating 44, which is also more continuously (as opposed to incrementally) adjustable. The spraying process may provide coating thicknesses as low as ten microns (10 μm) and as high as three thousand microns (3000 μm). The coating 44 may withstand breakdown voltages of three thousand volts (3000 V) to five thousand volts (5000 V), or even higher, at coating thicknesses ranging from fifty microns (50 μm) to two hundred microns (200 μm). Such relatively minimal coating thicknesses have less impact or effect on the dimensions of the bearing 1, thus enabling a perfect replacement of existing, non-insulated bearings; i.e., without the need for dimensional modifications to fit a specific application.

The present invention is not limited to any particular type of coating process. Common coating processes, such as for example, electrostatic spraying, solution spraying, or even flame spraying, may all be used to form the insulating coating 44 as long as the particular polymer used may be uniformly coated or applied on one or more corresponding surfaces of the bearing ring 1 and the desired dimensional requirements can be achieved. With an electrostatic spraying process, for example, polymer particles are first sprayed onto the corresponding surface(s) of a bearing ring, then heated and cured, followed by post-machining and finishing to precisely adjust the structural dimensions of the coating 44 and refine its surface form to the desired degree.

In addition, there is no strict limitation on the type of polymer or polymeric material used in the above spraying process. As long as the dielectric constant of a particular polymer is low enough and the mechanical properties of the polymer are capable of handling the various loads that the bearing 1 is subjected to during use, the purposes of the present invention can be achieved. Suitable coating materials for the present invention include, but are not limited to, polyphenylene sulfide (PPS), polyetheretherketone (PEEK) and/or nylon (PA). Of these three coating materials, PPS has a dielectric constant of only slightly greater than 3 at 100 Hz, which not only has good electrical insulation and excellent mechanical properties, but also has strong coating adhesion, small coefficient of thermal expansion and good dimensional stability. PEEK is both rigid and flexible, with particularly good fatigue resistance under alternating stresses, and has good electrical insulation properties at very high temperatures and low dielectric losses at high frequencies. PA materials in general have high mechanical strength, good fatigue resistance and excellent electrical insulation properties. All of the above materials are suitable candidates for the insulating coating 44 of the bearing rings 2, 3 as described in the present invention.

It should be understood by those skilled in the art that the above rolling bearing and its insulating coating are not limited by the specific embodiments and that the more general technical solutions will be subject to the limitations in the accompanying claims. Any changes and modifications to the present invention are within the scope of protection of the present invention, provided they conform to the limitations of the accompanying claims.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. An electrically insulated bearing ring comprising:
   a bearing ring having a polymeric insulating coating configured to block the passage of electrical leakage currents, the coating being applied solely by spraying a polymeric material directly onto a corresponding surface of the bearing ring other than a raceway surface, the coating being formed of a single polymeric material or a mixture of polymeric materials to provide a single coating.

2. The bearing ring according to claim 1, wherein the polymeric insulating coating is formed of at least one of polyphenylene sulfide (PPS), polyetheretherketone (PEEK) and nylon (PA).

3. The bearing ring according to claim 1, wherein the spraying is an electrostatic spraying, a solution spraying, or a flame spraying.

4. The bearing ring according to claim 3, wherein when the spraying is an electrostatic spraying, polymer particles are first sprayed on the corresponding surface of the bearing ring, then heated and cured, after which the surface morphology and structural dimensions of the coating are precisely adjusted by machining.

5. The bearing ring according to claim 4, wherein a thickness of the polymeric insulating coating is between ten microns (10 μm) and three thousand microns (3000 μm).

6. The bearing ring according to claim 5, wherein the thickness of the polymeric insulating coating is between fifty microns (50 μm) and two hundred microns (200 μm).

7. A rolling bearing comprising a bearing ring as recited in claim 1.

8. The rolling bearing according to claim 7, wherein the corresponding surface is at least one of an inner circumferential surface of an inner bearing ring and an outer circumferential surface of an outer bearing ring.

9. The rolling bearing according to claim 8, wherein the corresponding surface further includes at least one of surfaces of shoulders on both sides of an inner ring raceway and surfaces of shoulders on both sides of an outer ring raceway.

10. A method of forming an electrically insulated bearing ring, the method comprising the steps of:
    providing an annular body, the annular body having an inner circumferential surface, an outer circumferential surface and two end surfaces, and a polymeric material; and
    spraying the polymeric material directly onto at least one corresponding surface of the annular body other than a raceway surface so as to form a polymeric insulating coating configured to block the passage of leakage currents, the polymeric material being a single polymeric material or a mixture of polymeric materials to provide a single coating.

11. The method according to claim 10, wherein the polymeric material is formed of at least one of polyphenylene sulfide (PPS), polyetheretherketone (PEEK) and nylon (PA).

12. The method according to claim 10, wherein the spraying is conducted by an electrostatic spraying process, a solution spraying process, or a flame spraying process.

13. The method according to claim 10, wherein the spraying is conducted by an electrostatic spraying process and the method further comprises the steps of:
    heating and curing the polymeric insulating coating; and
    machining the coating to precisely adjust the surface morphology and dimensions of the coating.

14. The method according to claim 10, wherein a thickness of the polymeric insulating coating is between ten microns (10 μm) and three thousand microns (3000 μm).

* * * * *